July 21, 1959 H. COMROE 2,895,634
PLASTER PROTECTION PLATE FOR ELECTRIC CONNECTION BOXES
Filed April 26, 1954
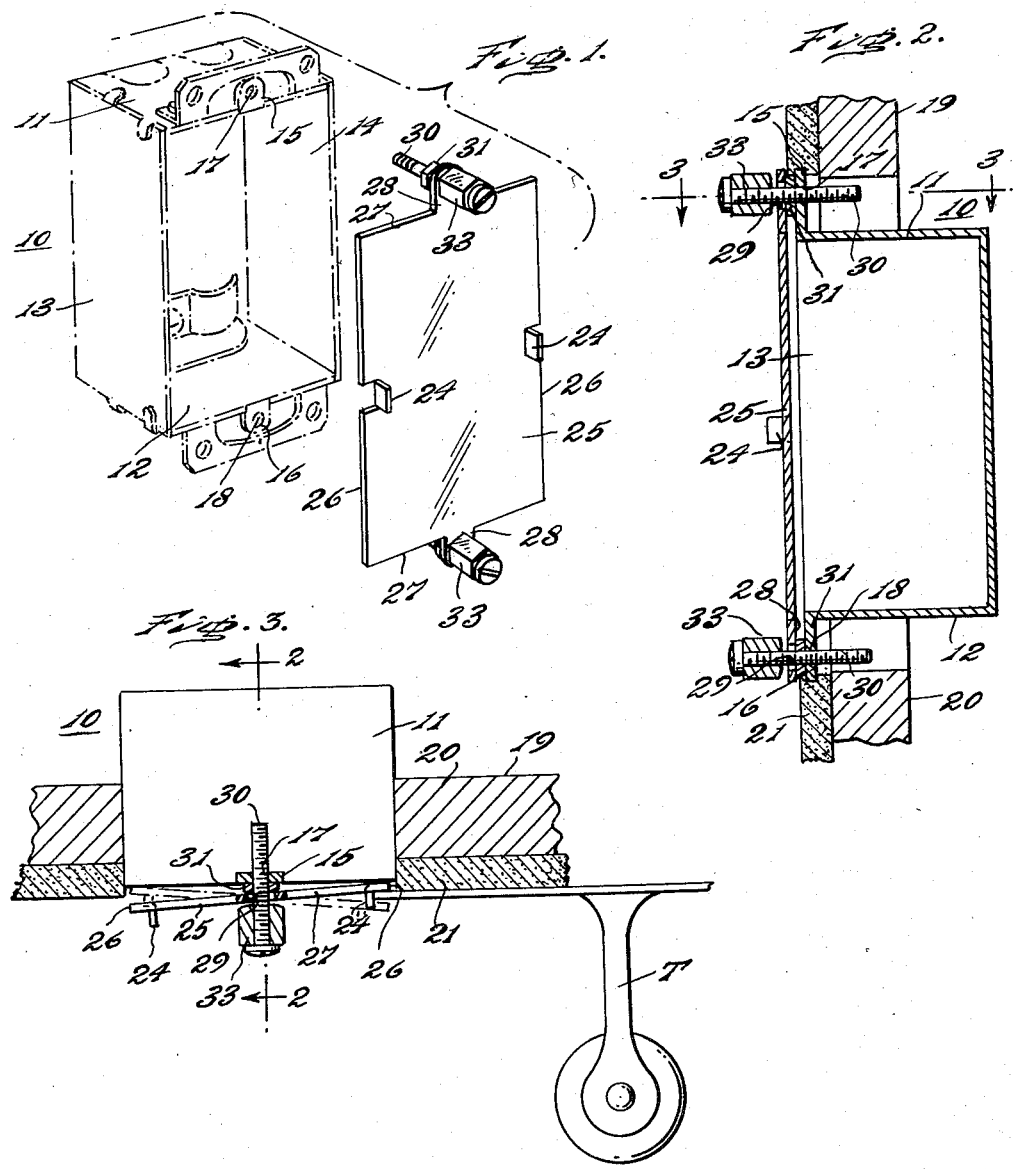
INVENTOR.
Herman Comroe
BY
ATTORNEY.

United States Patent Office 2,895,634
Patented July 21, 1959

2,895,634

PLASTER PROTECTION PLATE FOR ELECTRIC CONNECTION BOXES

Herman Comroe, Philadelphia, Pa.

Application April 26, 1954, Serial No. 425,513

3 Claims. (Cl. 220—3.4)

This invention relates to plaster protection plates for electric connection boxes.

In new housing construction, the installation of electric connection boxes with their interconnected electrical conductors usually precedes the plastering of the interior walls. During the plastering operations it is not infrequent for the plasterer to push plaster into the connection boxes and this may occur to an extent that the box is completely covered and cannot even be located in the wall without great difficulty.

It has heretofore been proposed to provide a flat cover plate with a plurality of resilient inwardly projecting tongues gripping the interior of the box and with the plate covering the open face of a connection box, and it has also heretofore been proposed to provide an inserted cover intended to be pried out with a screw driver. These devices have not proven satisfactory, probably because it is still possible to cover such plates with plaster and bury the same in the wall and also because upon removal injury to the plaster surrounding the box can easily result.

It is the principal object of the present invention to provide a protective plate for the open face of an electric connection box which is simple in construction, easily applied to the open face of such a box, and which will prevent the application of plaster in such manner as to hide or cover the plate or the connection box to which it is applied.

It is a further object of the present invention to provide a protective plate for the open face of an electric connection box which is so mounted as to prevent its being imbedded in or covered by the plaster of the wall.

It is a further object of the present invention to provide a protective plate for the open face of an electric connection box which is so mounted as to cut off or sever the plaster as the plaster is applied at the marginal edges of the open face of the box.

It is a further object of the present invention to provide a protective plate for the open face of an electric connection box which has fastening members of a character to discourage excessive tightening, and which fastening members also discourage the application of plaster over the plate.

It is a further object of the present invention to provide a protective plate of the character aforesaid which, after use at one location and removal, can be readily reused at another location.

Other objects and advantageous features of the invention will be apparent from the specification and claims.

The nature and characteristic features of the invention will be more readily understood from the following description, taken in connection with the accompanying drawings forming part thereof, in which;

Figure 1 is an exploded perspective view showing a connection box and a protective plate therefor in accordance with the invention;

Fig. 2 is a vertical central sectional view of the connection box shown in Fig. 1 with the protective plate mounted thereon, and taken approximately on the line 2—2 of Fig. 3; and Fig. 3 is a horizontal sectional view taken approximately on the line 3—3 of Fig. 2.

It should, of course, be understood that the description and drawings herein are illustrative merely, and that various modifications and changes may be made in the structure disclosed without departing from the spirit of the invention.

Referring now more particularly to the drawings, a conventional electrical connection box is shown at 10 having top and bottom walls 11 and 12, side walls 13 and 14, and front upwardly and downwardly extending integral lugs 15 and 16 with threaded holes 17 and 18.

Boxes 10 of this type are customarily provided in vertical walls, such as the wall 19, at the desired locations for switches, outlet plugs, side wall brackets and the like, and the wall is completed by applying on a suitable base 20, a finish plaster coat 21, after these boxes 10 have been placed in position. The boxes 10 have heretofore, except as previously indicated, been left open and exposed so that a careless plasterer could and frequently would either completely cover the box opening or by permitting plaster to overlap and extend into the opening of the box would interfere with the completion of the electrical work. Upon attempting to remove such overlapping plaster after the same had dried, injury to contiguous portions of the wall would also frequently result.

In accordance with the present invention, a plate 25 is provided, preferably substantially rectangular in shape, of a corresponding size to the front opening of the box 10. The plate 25 may be of any desired material, such as the material from which connection boxes are made, or it may be of synthetic plastic which is adequately resistant to the action of the constituents of the plaster. The plate 25, along the side marginal edges 26 thereof, and intermediate the top and bottom edges 27, preferably has a pair of struck out tongues 24 and at the mid portions of the top and bottom edges 27 is provided with lugs 28 having openings 29 therethrough for the reception of mounting screws 30 which are adapted to engage in the holes 17 and 18 of the box lugs 15 and 16. The openings 29 are preferably slightly larger than the diameter of the threaded portions of the screws 30 so that the screws 30 are freely movable and swingable and can be easily entered in the holes 17 and 18, whereby the plate 25 is loosely pivotally mounted at the front opening of the box 10. In order to aid in this type of mounting, spacing or fulcrum nuts 31 may be mounted on the screws 30, sufficient clearance being provided between the nuts 31, the lugs 28 and the heads 33 of the screws 30 to permit relative rocking movement of the lugs 28 and screws 30 at the openings 29.

The heads 33 of the screws 30 may be of any desired character but preferably include hexagonal portions of a length greater than their maximum cross sectional dimension, which may be grasped and turned by the fingers of the user upon insertion and advancing of the threaded portions of the screws 30 in the holes 17 and 18 but which discourage excessive tightening.

With the plate 25 held in place at the open face of the box 10, a pivotal or tilting action of the plate 25 may be readily effected.

Upon the application of a plaster coat, such as the coat 21, with a trowel T, the tongues 24 and the head portions 33 of the screws 30 provide abutments which prevent the plasterer from moving his trowel too close to the plate 25, and the tongues 24 further provide actuators tending to tilt or move the plate 25 on its mountings so as to shear the plaster away from the front opening of the box 10. At the same time clean terminal edges of the plaster coat are provided along the front marginal edges of the box 10 while entry of plaster into the box 10 is prevented.

Upon the completion of the plastering operation, the plate 25 may be readily removed, by turning the screws 33, and the plate 25 is then available for use with other connection boxes.

I claim:

1. A plaster protective cover for an electrical connection box which is provided with a front opening comprising a plate having inner and outer faces and having marginal edges spaced to provide an area of said plate substantially covering the front opening of the box, and mounting devices for said plate for removably mounting said plate in front of said front opening for limited rocking movement with respect to said front opening in mounted position, said mounting devices including a pair of spaced mounting pin members for removable engagement with said box at opposite sides of said front opening, said pin members having shank portions, said pin members in plate mounting position being normal to the plane of said front opening and extending outwardly therefrom, said plate contiguous to one pair of opposite marginal edges having openings therethrough through which said shank portions extend, said last openings being of sufficiently larger size than said shank portions to permit relative rocking movement of said plate and said mounting pin members, spacing members extending along said shank portions on the inner side of said plate and in operative position contacting said inner side for positioning said plate forwardly with respect to said front opening and providing fulcrums for rocking movement of said plate at said front opening on a pivotal rocking axis substantially parallel to said plate and forwardly of said front opening, said pin members having enlarged elongated heads in spaced relation to said spacing members, said heads extending entirely outwardly from said plate and providing abutments exteriorly of the outer fact of said plate for inhibiting plastering over said plate, and marginal portions of said plate on opposite sides of said pivotal axis providing abutments for engaging the box and limiting the rocking movement of said plate about said pivotal axis.

2. A plaster protective cover for an electrical connection box which is provided with a front opening comprising a plate having inner and outer faces and having marginal edges spaced to provide an area of said plate substantially covering the front opening of the box, and mounting devices for said plate for removably mounting said plate in front of said front opening for limited rocking movement with respect to said front opening in mounted position, said mounting devices including a pair of spaced mounting pin members for removable engagement with said box at opposite sides of said front opening, said pin members having shank portions, said pin members in plate mounting position being normal to the plane of said front opening and extending outwardly therefrom, said plate contiguous to one pair of opposite marginal edges having openings therethrough through which said shank portions extend, said last openings being of sufficiently larger size than said shank portions to permit relative rocking movement of said plate and said mounting pin members, spacing collars on said shank portions on the inner side of said plate and in operative position contacting said inner side for positioning said plate with respect to said front opening and providing fulcrums for rocking movement of said plate at said front opening on a pivotal rocking axis substantially parallel to said plate and forwardly of said front opening, said pin members having enlarged elongated heads on said shank portions in spaced relation to said spacing collars, said heads extending entirely outwardly from said plate and providing abutments exteriorly of the outer face of said plate for inhibiting plastering over said plate, and marginal portions of said plate on opposite sides of said pivotal axis providing abutments for engaging the box and limiting the rocking movement of said plate about said pivotal axis.

3. A plaster protective cover as defined in claim 2 in which said plate, in spaced relation to said pin member and contiguous to other opposite marginal edges from said first mentioned marginal edges, has projections extending forwardly from the outer face of said plate member and providing plastering obstructing projections.

References Cited in the file of this patent

UNITED STATES PATENTS

| | | |
|---|---|---|
| 476,032 | Bowerbank | May 31, 1892 |
| 989,854 | Kruse | Apr. 18, 1911 |
| 1,284,138 | Nusbaum | Nov. 5, 1918 |
| 1,679,775 | Lochok | Aug. 7, 1928 |
| 1,935,565 | Goetzelman | Nov. 14, 1933 |
| 2,002,491 | Despard | May 28, 1935 |
| 2,204,006 | Allen | June 11, 1940 |